US008965162B2

(12) United States Patent
Dragic

(10) Patent No.: US 8,965,162 B2
(45) Date of Patent: Feb. 24, 2015

(54) ANTI-GUIDING WAVEGUIDES

(76) Inventor: Peter Dragic, Chicago, IL (US)

(*) Notice: Subject to any disclaimer, the term of this patent is extended or adjusted under 35 U.S.C. 154(b) by 407 days.

(21) Appl. No.: 12/927,763

(22) Filed: Nov. 22, 2010

(65) Prior Publication Data

US 2011/0103759 A1   May 5, 2011

Related U.S. Application Data

(63) Continuation-in-part of application No. 11/863,247, filed on Sep. 27, 2007, now Pat. No. 7,840,110.

(60) Provisional application No. 60/847,473, filed on Sep. 27, 2006.

(51) Int. Cl.
    G02B 6/028   (2006.01)
    G02B 6/036   (2006.01)

(52) U.S. Cl.
    CPC ................ G02B 6/03694 (2013.01)
    USPC .......................... 385/123; 385/141

(58) Field of Classification Search
    CPC ... G02B 6/03694; G02B 6/02; H04B 10/2537
    USPC .......................... 385/123, 124, 141
    See application file for complete search history.

(56) References Cited

U.S. PATENT DOCUMENTS

| | | | | |
|---|---|---|---|---|
| 5,170,457 A * | 12/1992 | Jen | ................ | 385/123 |
| 5,303,318 A * | 4/1994 | Tateda et al. | ................ | 385/123 |
| 6,542,683 B1 * | 4/2003 | Evans et al. | ................ | 385/127 |
| 6,587,623 B1 * | 7/2003 | Papen et al. | ................ | 385/123 |
| 6,687,440 B2 * | 2/2004 | Balestra et al. | ................ | 385/123 |
| 6,856,740 B2 * | 2/2005 | Balestra et al. | ................ | 385/123 |
| 7,079,749 B2 * | 7/2006 | Dragic | ................ | 385/142 |
| 7,099,544 B2 * | 8/2006 | Bickham | ................ | 385/123 |
| 7,130,514 B1 * | 10/2006 | Chen et al. | ................ | 385/123 |
| 7,167,621 B2 * | 1/2007 | Manyam et al. | ................ | 385/123 |
| 7,340,137 B2 * | 3/2008 | Hasegawa et al. | ................ | 385/123 |
| 7,437,040 B2 * | 10/2008 | Flammer | ................ | 385/123 |
| 7,440,665 B2 * | 10/2008 | Hasegawa | ................ | 385/127 |
| 2002/0012378 A1 * | 1/2002 | Zenteno | ................ | 372/108 |
| 2002/0118935 A1 * | 8/2002 | Balestra et al. | ................ | 385/123 |
| 2004/0037529 A1 * | 2/2004 | Balestra et al. | ................ | 385/128 |
| 2004/0096170 A1 * | 5/2004 | Papen et al. | ................ | 385/123 |
| 2004/0190897 A1 * | 9/2004 | Satou et al. | ................ | 398/25 |
| 2005/0013569 A1 * | 1/2005 | Dragic | ................ | 385/123 |
| 2005/0211163 A1 * | 9/2005 | Li et al. | ................ | 118/308 |
| 2006/0171648 A1 * | 8/2006 | Hasegawa | ................ | 385/127 |

(Continued)

OTHER PUBLICATIONS

Dragic, P.D. "Acoustical-optical fibers for control of stimulated Brillouin scattering," LEOS Summer Topical Meetings, 2006 Digest of the, Jul. 2006.*

(Continued)

*Primary Examiner* — Peter Radkowski
(74) *Attorney, Agent, or Firm* — Carmen Patti Law Group, LLC

(57) ABSTRACT

Acoustically anti-guiding optical structures are provided. In an exemplary acoustically anti-guiding fiber, a suitable cladding size for ant guiding fibers occurs wherein the cladding size is determined such that the net material dampening in the cladding is large enough to dampen acoustic waves. In another embodiment, a cladding can be considered infinite if the round-trip time from a core to an outer cladding boundary (or interface) is greater than a coherence time of an acoustic wave.

22 Claims, 16 Drawing Sheets

(56) References Cited

U.S. PATENT DOCUMENTS

| | | | |
|---|---|---|---|
| 2007/0081779 A1* | 4/2007 | Flammer | 385/123 |
| 2007/0116416 A1* | 5/2007 | Chen et al. | 385/123 |
| 2007/0147755 A1* | 6/2007 | Hasegawa et al. | 385/123 |
| 2008/0013906 A1* | 1/2008 | Matsuo et al. | 385/127 |

OTHER PUBLICATIONS

Kobyakov et al., "Design concept for optical fibers with enhanced SBS threshold," Opt. Express, vol. 13, No. 14, pp. 5338-5346, Jun. 2005.*

Koyamada et al., "Simulating and designing Brillouin gain spectrum in single-mode fibers," Lightwave Technology, Journal of, vol. 22, No. 2, pp. 631,639, Feb. 2004.*

Li et al., "Fiber designs for reducing stimulated Brillouin scattering", Optical Fiber Communication Conference, 2006 and the 2006 National Fiber Optic Engineers Conference. OFC 2006, SBS and Slow Light in Fibers (OTuA). OTuA4, Mar. 5, 2006.*

McCurdy, A.H. "Modeling of stimulated Brillouin scattering in optical fibers with arbitrary radial index profile", Journal of Lightwave Technology, vol. 23, Issue.11, pp. 3509, 2005.*

Peter D. Dragic; Low SBS passive optical fibers for fiber laser pigtails, components, and power delivery. Proc. SPIE 7195, Fiber Lasers VI: Technology, Systems, and Applications, 71952L (Feb. 19, 2009); doi:10.1117/12.809558.*

Dragic, Peter D. et al; Optical Fiber with an Acoustic Guiding Layer for Stimulated Brillouin Scattering Suppression; CThZ3; pp. 1984-1986; 2005 Optical Society of America.

* cited by examiner

ANTI-GUIDING WAVEGUIDES

This application is a Continuation-in-Part of U.S. patent application Ser. No. 11/863,247, filed Sep. 27, 2007 now U.S. Pat. No. 7,840,110, and entitled "OPTICAL WAVEGUIDE" which claims benefit under 35 U.S.C.§119(e) of U.S. Provisional Application No. 60/847,473, filed Sep. 27, 2006, both of which are hereby incorporated herein.

BACKGROUND

Stimulated Brillouin Scattering (SBS) limits the maximum optical power for narrow-spectrum signals in fiber optic systems. As such, SBS suppression is crucial for the realization of very narrow linewidth systems, such as systems of <100 MHz, with power-length products that can excite a significant amount of Brillouin Scattering (SBS), depending on the application.

Aside from employing large mode area (LMA) fibers, a number of methods exist that can be exploited to suppress SBS. For example, according to one method the laser spectrum is broadened so that the signal's effective linewidth is greater than that of the Brillouin gain spectrum (BGS). Alternatively, in another method, BGS can be broadened, consequently decreasing the peak gain, by varying the core size in a drawn fiber, varying the index of refraction, and inducing stresses in the fiber.

SBS is a well-known interaction between an acoustic wave and the optical field in fiber. In general, the scattering amplitude can be found from a volume integral $$D_{p,q} = \int_{Vol} \vec{E}_p^* \delta\vec{\varepsilon}_{p,q} \vec{E}_{iq} \, dV$$

where $p,q=r,\phi,z$ are the cylindrical coordinates, $\vec{E}$ is the electric field, and $\delta\vec{\varepsilon}$ are the dielectric perturbations resulting from the acoustic strain. Taking the optical field component $E_z$ to be zero in the fiber, the non-zero contributions to the scattering amplitude are $D_{rr}$, $D_{\phi\phi}$, and $D_{r\phi}$ (=$D_{\phi r}$). The relevant dielectric perturbations ($\delta\varepsilon_{p,q}$) are functions of the acoustic strain fields ($S_{p,q}$) and are expressed as $$\delta\varepsilon_{rr} = -\varepsilon_0 n^4(p_{11}S_{rr}+p_{12}S_{\phi\phi}+p_{12}S_{zz})$$

$$\delta\varepsilon_{\phi\phi} = -\varepsilon_0 n^4(p_{11}S_{\phi\phi}+p_{12}S_{rr}+p_{12}S_{zz})$$

$$\delta\varepsilon_{\phi r} = -\varepsilon_0 n^4 2p_{44}S_{\phi r}$$

where n is the index of refraction and $\varepsilon_0$ is the permittivity of free space. The photoelastic constants, p, are provided, for example, for vitreous silica at $\lambda$=632.8 nm as $p_{11}$=0.121, $p_{12}$=0.271, and $p_{44}$=−0.075. The generalized form of the acoustic strain field can be written as a function of the displacement vector $\vec{u}$ $$S_{pq} = \frac{1}{2}\left(\frac{\partial u_q}{\partial p} + \frac{\partial u_p}{\partial q}\right)$$

In general, the components of $\vec{u}$ are coupled and can be found from a generalized damped acoustic wave equation, $$\rho\ddot{u} - \nabla \cdot [\bar{c}\nabla u + \bar{\eta}\nabla \dot{u}] = -\frac{1}{2}\nabla \cdot [\bar{\gamma}E_k E_l]$$

where the electrostrictive coefficients are given by a fourth rank tensor in $\bar{\gamma}$, and the damping term, $\bar{\rho}$, is a tensor of rank four. Finally, $\bar{c}$ is the rank-four elastic modulus tensor. A damped wave equation is considered since at the acoustic frequencies involved in SBS (~10-20 GHz) the acoustic wave is heavily damped. However, a few common approximations can be made to the generalized damped acoustic wave equation above, which simplify finding mode solutions for the equation. The first is to assume that the electrostrictive force term, $$-\frac{1}{2}\nabla \cdot [\gamma_{ijkl}E_k E_l],$$

can be neglected. Second, one may assume that the material damping coefficient $\bar{\rho}$ in the generalized damped acoustic wave equation is zero. An exponential decay term originating from material damping is then appended to the resulting mode solutions. Both of these quantities, i.e. the damping and force terms, are changing in the radial direction within the fiber. With the generalized damped acoustic wave equation simplified, the general solutions U can be taken to be a superposition of solutions, $\phi$ and $\Psi$, of two equations for the longitudinal and transverse waves, respectively, as follows $$U = \nabla\phi + \nabla\times\Psi$$

$$(\nabla_t + h_2)\phi = 0$$

$$(\nabla_t = k_2)\Psi = 0$$

where h and k are complex propagation constants. We define h and k as in any layer i to be $$h_i = \sqrt{\pm\left(\frac{2\pi v_B}{V_{L_i}}\right)^2 \mp \beta^2}$$

$$k_i = \sqrt{\pm\left(\frac{2\pi v_B}{V_{S_i}}\right)^2 \mp \beta^2}$$

where $v_B$ is the acoustic frequency, $V_L$ is the material longitudinal acoustic velocity and $V_S$ is the material shear velocity. In these equations $\beta$ is the propagation constant of the acoustic wave. The correct sign will depend on which Bessel functions are solutions (J, Y or I, K) in any given layer with consideration to the acoustic velocity. The acoustic velocities in any given layer i are functions of the Lamé constants ($\lambda_i$ and $\mu_i$) as $$V_{L_i} = \sqrt{\frac{\lambda_i + 2\mu_i}{\rho_i}}$$

$$V_{S_i} = \sqrt{\frac{\mu_i}{\rho_i}}$$

To determine the acoustic eigenmodes of an acoustical fiber, the general solution U above is solved subject to the typical boundary conditions. First, the displacement vector should be continuous at any interface. Second, the two shear stresses at the interface and the normal compressional stress must be continuous at any boundary. This introduces only two additional equations on top of the displacement vector boundary conditions.

In the SBS interaction, the dominant displacement vector component is $u_z$. This makes sense since SBS is known to result from a longitudinally varying acoustically-induced Bragg grating. Further, the analysis in "Backward Collinear Guided-Wave-Acousto-Optic Interactions in Single-Mode Fibers," by C.-K Jen and N. Goto, J. Lightwave Technol. 7, 2018-2023 (1989), showed that $D_{rr}$ is the dominant scattering amplitude, and thus, $p_{12}$ (on $S_{zz}$) plays the most significant role in determining the Brillouin gain. For completeness, the four requisite boundary conditions at an interface r=a between any regions 1 and 2 are provided in the following boundary equations:

$$u_{r1}(r=a) = u_{r2}(r=a)$$

$$u_{z1}(r=a) = u_{z2}(r=a)$$

$$T_{rr} = T_1$$

$$= (\lambda_1 + 2\mu_1)\frac{\partial u_{r1}}{\partial r}\bigg|_{r=a} + \lambda_1 \frac{u_{r1}}{r}\bigg|_{r=a} + \lambda_1 \frac{\partial u_{z1}}{\partial z}\bigg|_{r=a}$$

$$= (\lambda_2 + 2\mu_2)\frac{\partial u_{r2}}{\partial r}\bigg|_{r=a} + \lambda_2 \frac{u_{r2}}{r}\bigg|_{r=a} + \lambda_2 \frac{\partial u_{z2}}{\partial z}\bigg|_{r=a}$$

$$T_{rz} = \mu S_{rz}$$

$$= \mu S_5$$

$$= \mu_1 \left(\frac{\partial u_{r1}}{\partial z} + \frac{\partial u_{z1}}{\partial r}\right)\bigg|_{r=a}$$

$$= \mu_2 \left(\frac{\partial u_{r2}}{\partial z} + \frac{\partial u_{z2}}{\partial r}\right)\bigg|_{r=a}$$

The Lamé constants $\lambda_i$ should not be confused with the optical wavelength $\lambda$.

In terms of solutions to the generalized damped acoustic wave equation, a scalar-wave part leads to longitudinal-wave components while a vector-wave part leads to shear waves. The general solution to the wave equation, general solution U above, (for the l=0 modes) for the three (cylindrical) components of the displacement vector are $$u_r(r) = AhX'_l(hr) + B\beta Z'_l(kr)$$

$$u_\phi(r) = 0$$

$$u_z(r) = -jA\beta X_l(hr) + jBkZ_l(kr)$$

where X and Z are linear combinations of the normal Bessel functions (J, Y, I, and K), paying particular attention to the physicality of the problem. In particular, when the eigenmode solution has an acoustic velocity greater than the material in a particular layer, the solutions are combinations of the Bessel functions of the first (J) and second kinds (Y) in that layer. When the eigenmode solution has an acoustic velocity that is less than the material, then combinations of the modified Bessel functions of the first (I) and second (K) kinds. A and B represent complex coefficients (system unknowns) which determine the characteristic matrix, and $j=(-1)^{1/2}$. The primes are derivatives respect to the whole argument and not r alone.

The eigenvalues obtained from the characteristic matrix determined by subjecting the three (cylindrical) components of the displacement vector to the boundary equations above are the acoustic frequencies ($v_a$) for each eigenmode of the system since the propagation constant is fixed to $$\frac{2\pi n}{\lambda}$$

via the Bragg condition, where n is the index of the optical mode. In this case, since there are three boundaries, the characteristic matrix is 12×12.

Finally, the observed Brillouin gain coefficient is proportional to $|D_{p,q}|^2$. However, if the volume integral above is normalized with respect to coefficients and optical intensity and acoustic field, then we may determine a BGS from $$\sum_m g_B(v_{a_m}) \frac{(\Delta v_{B_m}/2)}{(v-v_{a_m})^2 + (\Delta v_{B_m}/2)^2} \Gamma_m$$

where the Brillouin spectral width $\Delta v_B$ (FWHM) may be different for each acoustic mode with eigenfrequency $v_a$. Acquiring values that are ≤1, $\Gamma$ is the square of a normalized scattering the volume integral, and is unique for each acoustic mode m.

In order to control the acoustic and refractive index properties of the core, Table I (below) shows the effect of some common fiber dopants on the acoustic index and optical refractive index ($n_o$) when added to pure silica (assuming $n_a=1$ for pure silica). In Table I, RE represents Rare Earth.

Aside from using large mode area (LMA) fibers, numerous methods exist that can be exploited to suppress SBS. First, one can broaden the laser spectrum so that the signal's effective linewidth is greater than that of the Brillouin gain spectrum (BGS). Alternatively, one can broaden the BGS, consequently decreasing the peak gain, by varying the core size in a drawn fiber, varying the index of refraction, and inducing stresses in the fiber.

There are known solutions that specify that the cladding-to-buffer boundary is a significant one and is included in the acoustic mode simulations, adding a set of boundary conditions to the set defined by the above boundary equations. This results in a waveguide consisting of hundreds of modal solutions greatly encumbering simulations of a fiber under design. More importantly, however, is that these solutions lead to a propagation constant β that is real-valued, thereby precluding the design of acoustically anti-guiding optical fibers, or fibers with large acoustic attenuation coefficients.

Thus, since acoustic anti-guidance does not exist according to known theory, this leads to designs that explicitly require the tailoring of the properties of acoustically waveguiding layers in order to suppress SBS. In the case of fibers where the core acoustic velocity is greater than that of the cladding, known teachings state that the core is dominated by an interaction with cladding modes that cannot be overcome. Therefore, known theories teach that SBS suppression via acoustically anti-guiding fibers with large acoustic waveguide attenuation coefficients is not possible.

SUMMARY

In accordance with the principles herein, acoustically anti-guiding optical structures can be achieved. For example, in order to achieve an acoustically anti-guiding fiber, a cladding of the fiber should be set to effectively extend to infinity, such that a cladding to buffer interface of the fiber can be neglected. In accordance with the principles herein, one embodiment to achieve a suitable cladding size for anti-guiding fibers occurs wherein the cladding size is determined such that the net material dampening in the cladding is large enough to dampen acoustic waves.

Further, in accordance with the principles herein, fibers engineered with acoustic waveguide losses, or attenuation, that also possess broadened BGS with reduced peak gain can be achieved. In this case, the acoustic velocity of the core is greater than that of an adjacent cladding. The outer boundary of this cladding can be considered mathematically to be infinitely far away from the core. The physical properties of the core are then adjusted such that the acoustic waveguide attenuation coefficient (in units of m$^{-1}$) is at least $\frac{1}{10}$ of that of the material damping coefficient of the material comprising the core.

In an embodiment, anti-guiding fibers can be achieved in accordance with the principles herein by selecting the cladding size such that the net material damping in the cladding is large enough to dampen acoustic waves. Suitable cladding sizes can include, for example, 125 micrometers or greater. Thus, a cladding diameter of greater than 90 micrometers will result in acoustic damping in the cladding of greater than 1/e and the cladding to buffer interface can be neglected.
A waveguide constructed in accordance with this embodiment will prevent acoustic waves from reflecting off the cladding-buffer interface, and from consequently re-entering the core.

For example, at an optical wavelength near 1550 nm, pure silica is known to have a Brillouin spectral width in the vicinity of 20 MHz and acoustic velocity of 5970 m/s. Using $$\Delta v_B = \frac{V_a \alpha}{\pi}.$$

an attenuation coefficient, $\alpha$, of, for example, pure silica is calculated to be about $1.1 \times 10^4$ m$^{-1}$, and depending on how the cladding material is processed and on the composition of the cladding material, such as, for example, when water is present in the cladding material itself, the attenuation coefficient can vary from around 10-40 MHz. Thus, for example, for pure silica, a 1/e damping length of about 90 micrometers is calculated. Thus, a cladding diameter of greater than 90 micrometers will result in acoustic damping in the cladding of greater than 1/e and the cladding to buffer interface can be neglected.

Many commercial fibers have a diameter of approximately 125 micrometers. Laser claddings are bigger than other commercial fibers, and the size of the fiber depends on the configuration.

A pictorial representation of a decaying acoustic wave is illustrated in FIG. 5, and discussed herein below. Although the position of an outer boundary of the cladding 'b' is not infinite, the acoustic wave decays to a very low value once it returns to the core. Thus, it is equivalent to say that position 'b' is positioned infinitely far from the core, such that no acoustic waves return to the core.

In another embodiment, an infinite cladding can be implemented based on consideration of an acoustic wave coherence of a waveguide. Specifically, a cladding can be considered infinite if the round-trip time from a core to an outer cladding boundary (or interface) is greater than a coherence time of an acoustic wave. Since the acoustic wave involved in SBS has a finite spectral width, the coherence length of the acoustic wave is linked to the spectral width of the acoustic mode. For a Lorentzian spectral width, the coherence time of the acoustic wave is given by $$\tau_c = \frac{1}{\pi \Delta v_B}$$

where $\Delta v_B$ is the Brillouin spectral width (full width at half maximum). An acoustic wave reflecting from the outer boundary of the cladding has a round-trip time of $2b/V_c$, where b is the position of the cladding outer boundary and $V_a$ is the cladding acoustic velocity. And therefore, it is preferred that $$\frac{1}{\pi \Delta v_B} < 2b/V_c.$$

In this case, any acoustic waves not attenuated through material damping in the cladding will not be able to interfere with or contribute to SBS in the core.

The conditions set above gives rise to cladding solutions for the acoustic wave that are Hankel functions. Hankel functions are considered to be radiation modes that give rise to a complex propagation constant ($\beta = \beta_{real} - j \gamma_{wg}$) solution to acoustic modes in the core. The complex part of the propagation constant $\gamma_{wg}$ describes the waveguide attenuation, and the total attenuation experienced by the acoustic wave is $\gamma_{wg} + \gamma_{mat}$ where '$\gamma_{mat}$' refers to material damping. Using the model presented above with Hankel functions, H, substituted for X and Z for the cladding region in the acoustic wave equations, $(H(x)=J(x)-jY(x)=K(jx))$ the core acoustic velocity properties and distribution are set such that the waveguide attenuation coefficient is at least $\frac{1}{10}$ of the intrinsic material damping coefficient.

Additionally, as set forth below with respect to Table 1, dopants can be selectively employed in accordance with the principles herein to adjust the acoustic characteristics of all anti-guiding structures constructed in accordance with the principles herein.

TABLE I

EFFECT OF DOPANT ON THE OPTICAL AND ACOUSTIC INDEX OF SILICA

| | Ge | P | Ti | B | F | Al | Y | RE |
|---|---|---|---|---|---|---|---|---|
| $n_o$ | ↑ | ↑ | ↑ | ↓ | ↓ | ↑ | ↑ | ↑ |
| $n_a$ | ↑ | ↑ | ↑ | ↑ | ↑ | ↓ | ↓ | ↑ |

The results for the rare earth and yittrium data displayed in Table 1 above are new, and can be used to form anti-guiding fibers in accordance with the principles herein. Since most fibers are primarily silica, the addition of selected common and new dopants provided in Table 1 shows how the acoustic characteristics of the silica change. An optical waveguide can be achieved by increasing the optical index of the silica.

DETAILED DESCRIPTION

Figure 1:
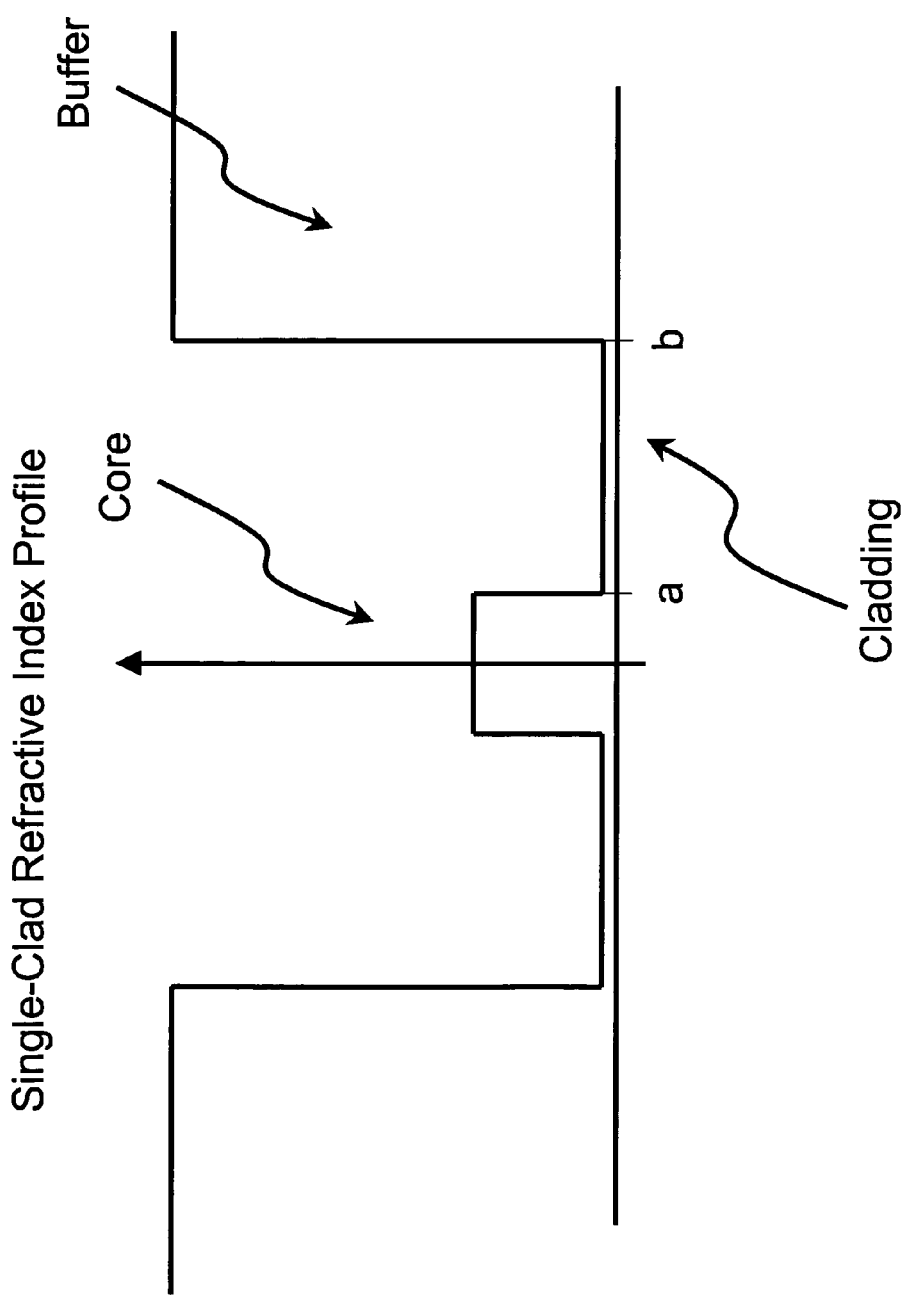
FIG. 1 illustrates a refractive index profile of a standard step index single clad optical fiber. Position 'a' is the core-cladding interface and 'b' is the position of the cladding-buffer interface.

In accordance with the principles herein, anti-guiding structures can be achieved in a variety of embodiments, using various principles and options, such as dopants. To this end, the underlying physical principles set forth herein are suitable for use in a wide variety of configurations and materials, while specific examples herein are meant only to illustrate a few of the possible variations of structures that can be achieved in accordance with the principles herein.

One such structure includes an anti-guiding waveguide configuration. The waveguide includes an optical core having an optical core radial thickness and a core index of refraction. The optical core includes at least one optical cladding adjacent the core, the at least one optical cladding having a cladding index of refraction, wherein the core and the cladding together define an optical mode. An acoustic waveguide operatively connected to the optical core having one or more acoustic core regions and one or more acoustic cladding regions is also provided. The at least one acoustic core region has a core acoustic velocity, while the at least one acoustic cladding layer has a cladding acoustic velocity. A doping profile and relative thicknesses of each acoustic cladding layer or of the core layers is selected such that an acoustic waveguide loss occurs in the SBS process. The acoustic waveguide loss arising from the combined doping profile and a selected size of the acoustic cladding layer or core layers increases the SBS threshold, and the waveguide is acoustically anti-guiding.

In an embodiment, an overlap integral of each acoustic mode present in the acoustic waveguide has an overlap integral with an optical mode of less than 0.75.

In yet another embodiment, an overlap integral of each acoustic mode present in the acoustic waveguide has an overlap integral with an optical mode of less than 0.5.

In still another embodiment, a frequency spacing between each acoustic mode is greater than one half of the Brillouin bandwidth.

In an embodiment, the acoustic waveguide loss coefficient takes on a value between one tenth and one times the acoustic wave damping coefficient.

In another embodiment, the acoustic waveguide loss coefficient takes on a value greater than one times the acoustic wave damping coefficient.

An embodiment of an acoustically anti-guiding fiber can be constructed in accordance with the principles herein. The fiber includes a fiber core. A fiber cladding is provided adjacent to the fiber core, wherein an interface is formed at an outer boundary of the fiber cladding. Either a fiber cladding size is selected, such that a net material dampening loss in the cladding is sufficiently large to dampen acoustic waves, or the cladding is selected such that a measured round-trip time of an acoustic wave from the core to the outer boundary, or a wave return time, is greater than a coherence time of the acoustic wave to dampen Brillouin Scattering (SBS). In an embodiment, either condition is achieved by doping at least one of the core and the cladding. For example, the core can be formed of a silica core material doped with $Al_2O_3$ and co-doped with either $GeO_2$ or $P_2O_5$, such that the $Al_2O_3$ content is at minimum 1.76×$GeO_2$ or 2.43×$P_2O_5$ content (mole %). Alternatively, a $SiO_2$ core can be co-doped with $GeO_2$, $P_2O_5$, and $Al_2O_3$.

In yet another embodiment, an anti-guiding optical fiber can includes an optical core, wherein the optical core has a diameter of more than 10 microns. Aluminum can be substantially uniformly distributed radially outward from the center of the core throughout the core material. Additionally, at least one of Ge and P with increasing content in an outward radial direction from the core can be provided. A layer provided in either the outer core or inner cladding, can be operatively connected to the optical core and containing at least 4 mol % in aggregate of one or both of Ge and P. Additionally, at least one of B and F can be employed, wherein the content of the at least one of B and F is increasing in the radial direction outward from the center of the core, and wherein acoustic velocity decreases radially outward from the center of the core.

In yet another embodiment, $B_2O_3$ or F is selectively added to the core when the index of refraction is too large. A region of raised optical index may be included directly adjacent or in near vicinity to the core if B or F cannot be used. The vicinity of raised index possessing an optical index of refraction that is greater than an outer cladding region.

Another embodiment of an anti-guiding optical fiber constructed in accordance with the principles herein can include an optical core containing at least one of Aluminum and Yttrium, wherein the fiber has an acoustic waveguide attenuation coefficient of at least one half of the material dampening coefficient of pure silica. The fiber can further be defined by the Aluminum content in the core being substantially non-uniform. The fiber can be even further defined wherein an acoustic velocity of the core decreases radially outward from a center of the core.

The core can be surrounded by a cladding, and wherein the cladding has a lower acoustic velocity than any region of the core. Further, the cladding can be doped.

The core acoustic velocity can be selectively reduced by adding additional dopants. The optical core can include an acoustic core, wherein an acoustic velocity of the fiber decreases radially outward from the center of the core.

Figure 2:
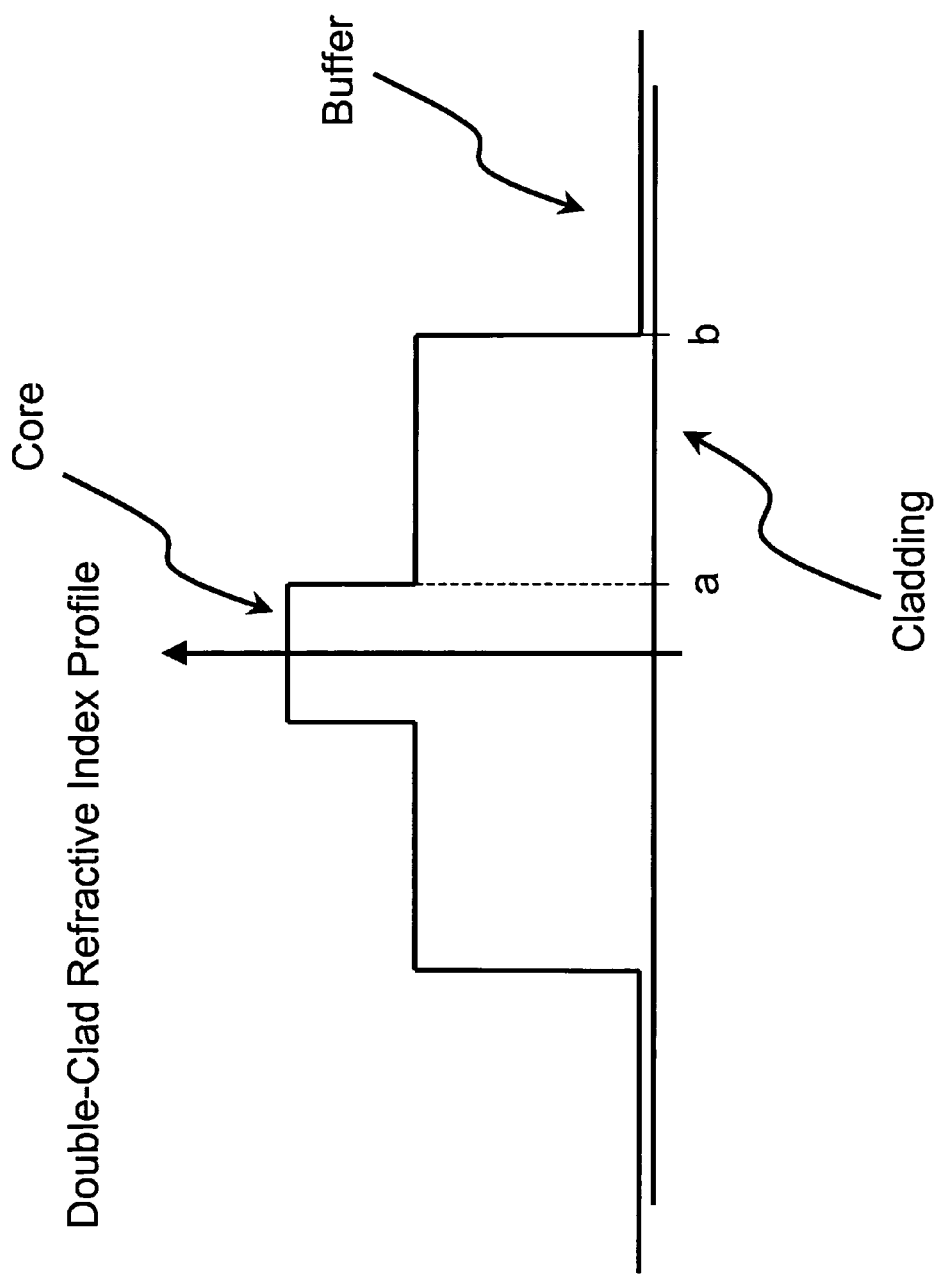
FIG. 2 illustrates a refractive index profile of a standard step index double clad optical fiber. Position 'a' is the core-cladding interface and 'b' is the position of the cladding-buffer interface.

FIGS. 1 and 2 provide the refractive index profiles of typical step index single-clad and double-clad fibers, respectively. Position 'a' is the interface between the core and cladding. Position 'b' is the interface between the cladding and buffer, with the buffer considered to extend to infinity.

Figure 3:
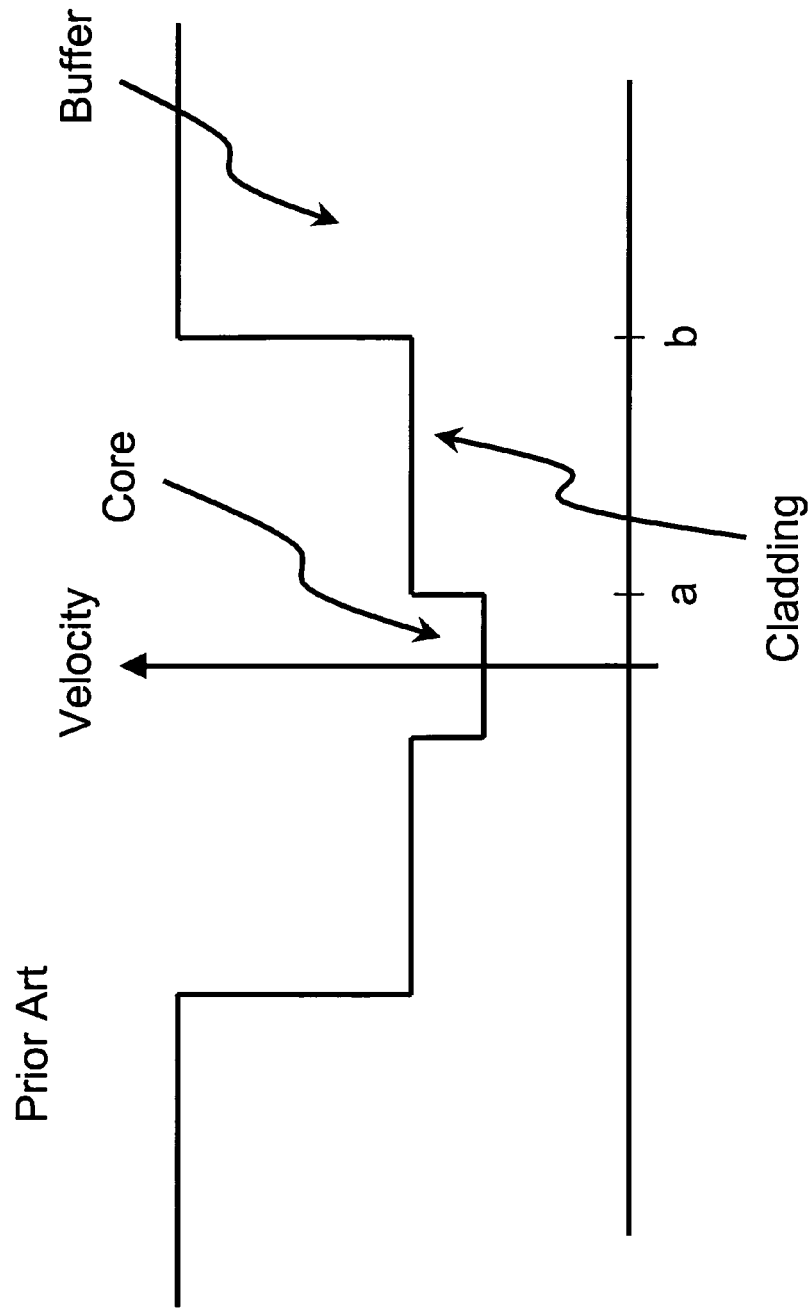
FIG. 3 illustrates a generalized known acoustic velocity profile showing a buffer.

FIG. 3 shows a typical known acoustic velocity profile of an acoustically guiding optical fiber.

Figure 4:
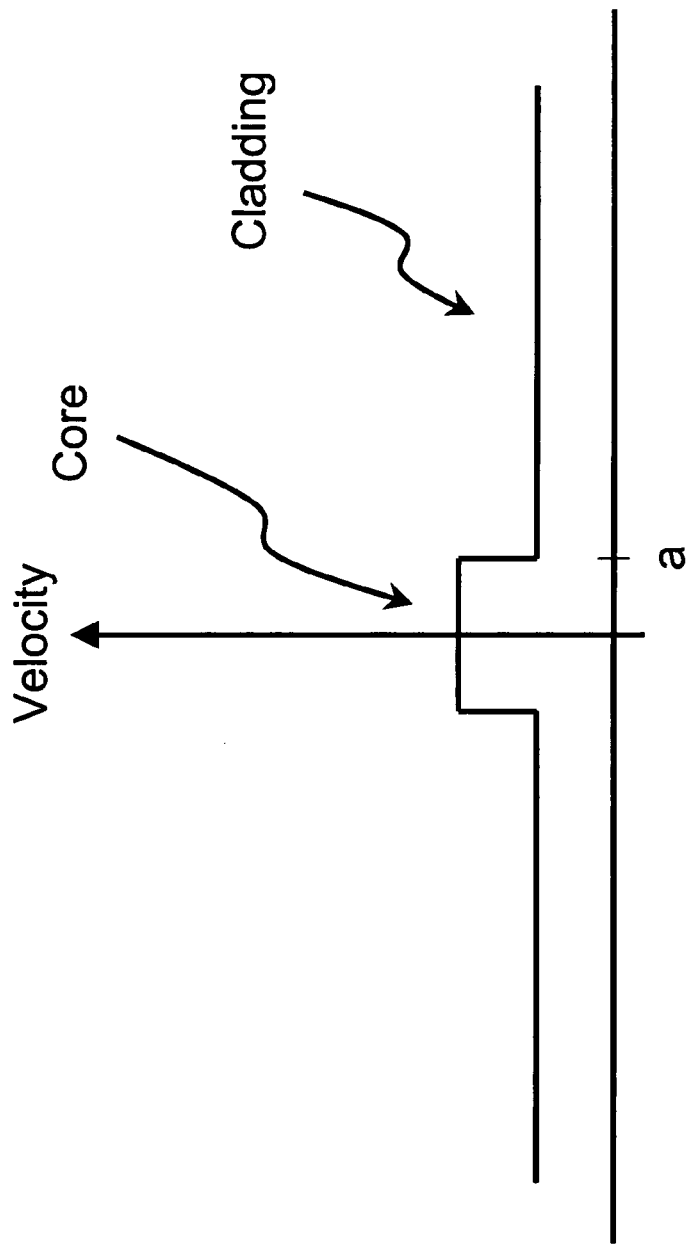
FIG. 4 illustrates a generalized acoustic velocity profile wherein a cladding extends to infinity, in accordance with the principles herein.

As shown in FIG. 4, a generalized acoustic velocity profile is provided, wherein a cladding extends to infinity.

Figure 5:
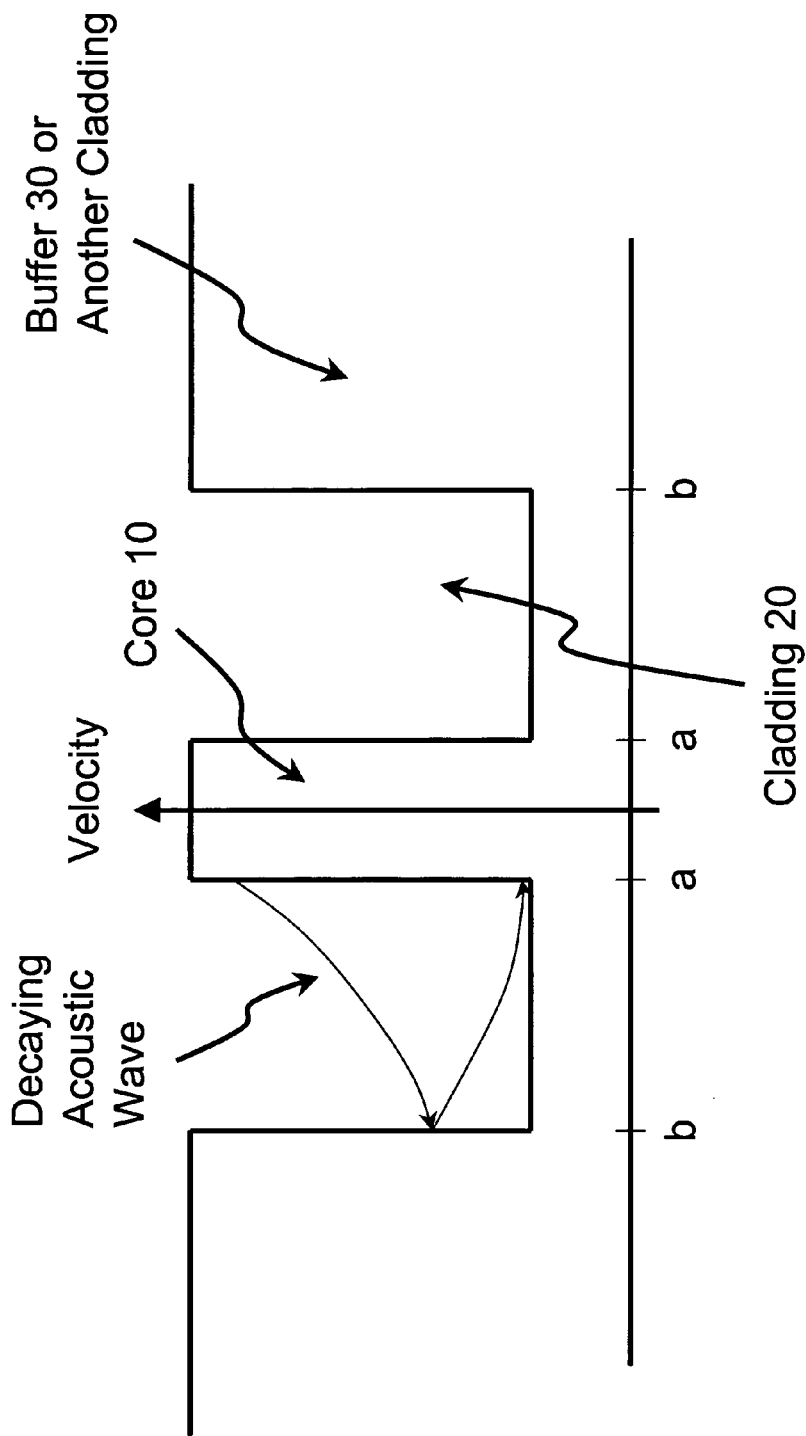
FIG. 5 illustrates an acoustic velocity profile of an anti-guiding structure constructed in accordance with the principles herein showing the decay of the acoustic wave as it propagates one round trip from the core. If the material damping is large enough it is mathematically equivalent to say that position 'b' is at infinity.

FIG. 5 illustrates the trajectory of an acoustic wave with respect to the boundaries, wherein the amplitude is decaying with distance (acoustic damping).

Figure 6:
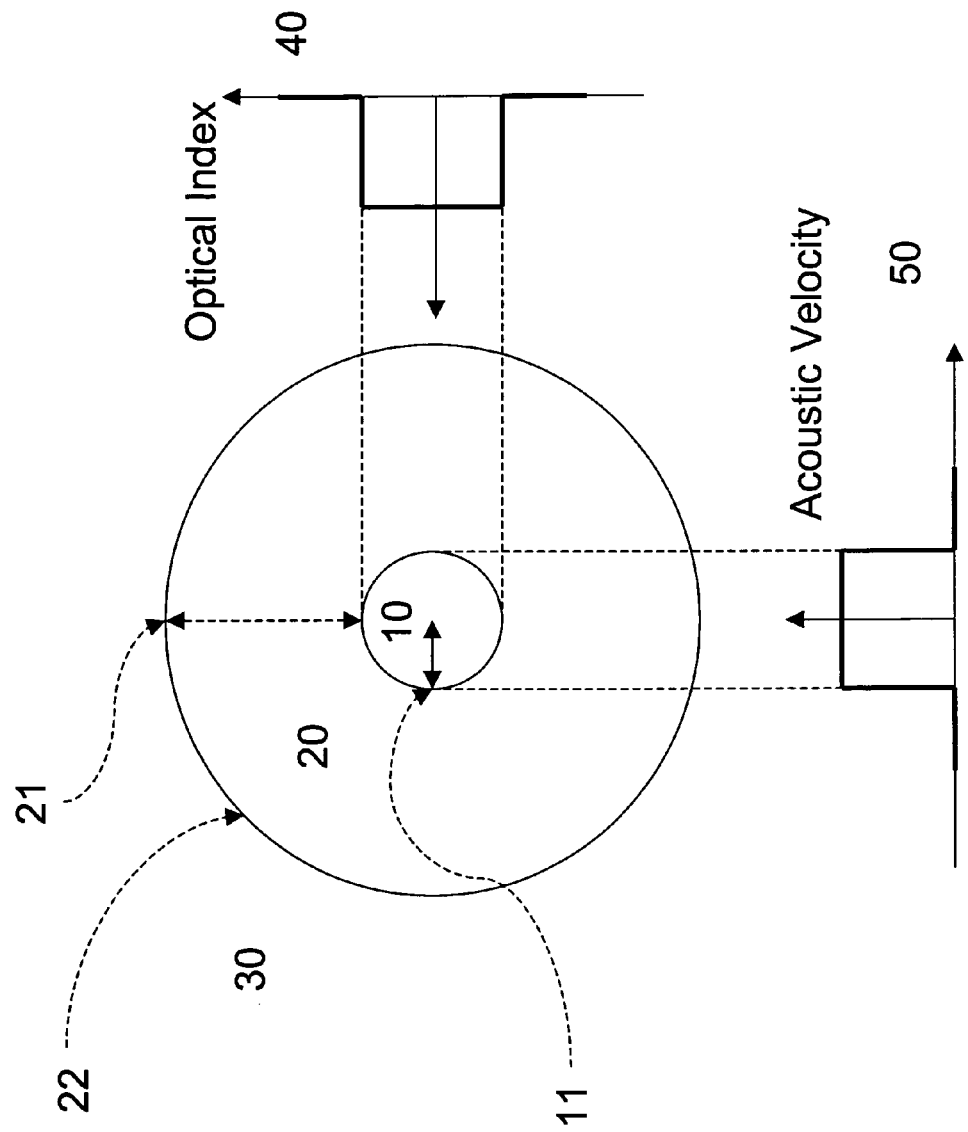
FIG. 6 illustrates an end view of an exemplary waveguide configuration of a traditional step-index fiber showing, in particular, a schematic representation of each of the optical and acoustic profiles thereof.

FIG. 6 illustrates an acoustic anti-guide structure, such as, for example, a fiber, or a waveguide, constructed in accordance with the principles herein shown generally at 100. The structure 100 includes a core 10, a cladding 20, and buffer 30 (region extending beyond 20 of FIG. 6). The structure 10 is well suited for numerous uses, such as, for example, a telecommunication fiber, a laser fiber, a sensing fiber, coherent light conduit fiber, or any other suitable commercial or other use. Typically, the body of the structure 10 can be formed from a suitable material or substrate, such as, for example, glass ($SiO_2$), wherein the material can be optionally doped as necessary, if desired, to achieve an anti-guiding acoustical profile, such as, for example optical profile 40 and an acoustic profile 50 as discussed in greater detail hereinbelow.

The optical profile 40 of the structure 100 includes the optical core 10 and the optical cladding 20. The optical core 10 has an optical core radial thickness and an optical core index of refraction. While not limited thereto, in an embodiment, at least 60% of the light is directed through the optical core 10. The optical core index of refraction can have a profile that can vary within the core itself. Various optical cores having non-uniform indices of refraction across their respective radii can be produced. The optical core diameter of a typical structure, such as an optical fiber or waveguide, constructed in accordance with the principles herein can range, for example, from approximately 2 microns to approximately 20 microns in diameter, and can even range up to approximately 80 microns in diameter. Non-typical structures can be manufactured as well, in accordance with the principles herein, and can have optical core diameters of ranges beyond those known in the typical structures.

The optical cladding 20 includes an optical cladding radial thickness 21 and an optical cladding index of refraction. As with the optical core index of refraction, the optical cladding index of refraction may be uniform along the cross-sectional configuration of the fiber, or may be varied across the cross-sectional configuration of the fiber. An outer boundary 22 of the optical cladding 20 plays a diminished role in the longitudinal SBS interaction.

Figure 7:
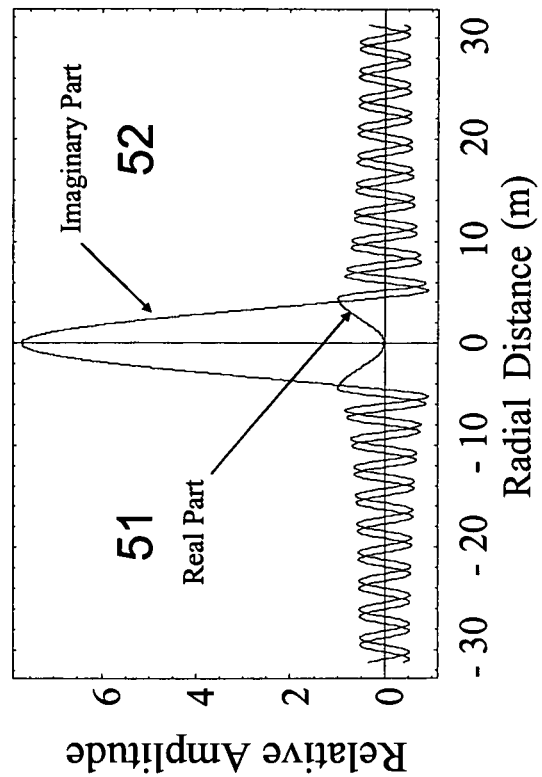
FIG. 7 illustrates both real and imaginary parts of a displacement vector component u for the first exemplary embodiment of a 9 μm core.

As illustrated in FIG. 7, for an anti-guiding fiber of larger core diameter, such as, for example, approximately 9 micrometers, plots of the real (51) and imaginary parts (52) of a first mode of the acoustic wave, calculated from the model above.

Figure 8:
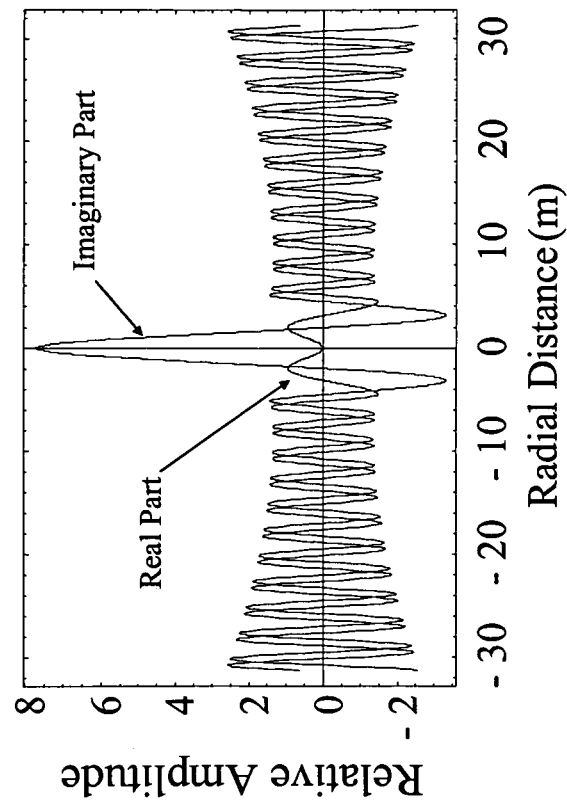
FIG. 8 illustrates both real and imaginary parts of a displacement vector component u for a second mode of the first exemplary embodiment of a 9 μm core.

FIG. 8 illustrates a second mode in the set described by the example of the approximately 9 micrometer core fiber. This mode has a degraded acousto-optic overlap integral and increased acoustic wave loss, consistent with the acoustic modes radiating from the core. As a result, these higher-order modes generally do not contribute to SBS in a traditional step-index fiber.

Figure 9:
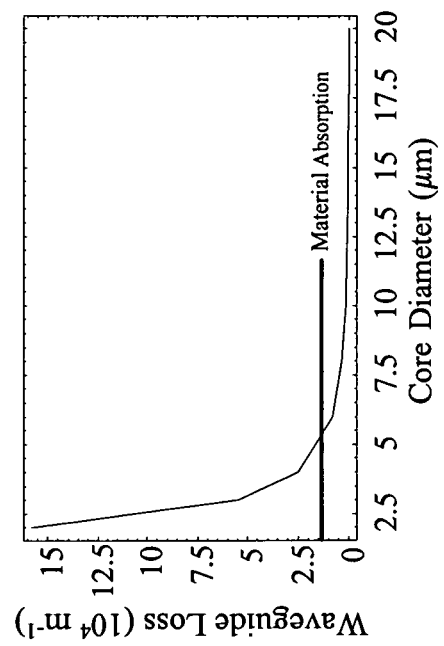
FIG. 9 illustrates a waveguide loss vs. core diameter for the exemplary parameters provided in the first exemplary embodiment.

As seen in FIG. 9 the calculated acoustic waveguide loss coefficient versus core diameter is illustrated using the model above with the core acoustic velocity being 100 m/s greater than that of the cladding. For the approximately 9 micrometer core diameter fiber of the example above, it falls well below the material damping loss coefficient. However, in an embodiment, this fiber has an acoustic waveguide loss coefficient that is greater than the material damping coefficient.

Figure 10:
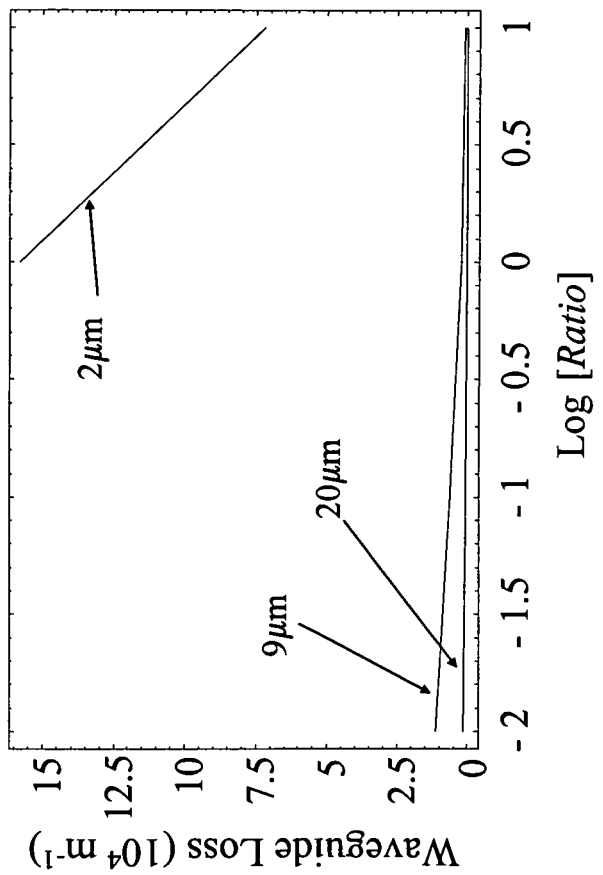
FIG. 10 illustrates a waveguide loss versus core-to-cladding acoustic velocity contrast. An optional doping contrast can play a very small role in bigger core fibers.

Therefore, FIG. 10 illustrates a calculation of the acoustic waveguide loss as a function of the logarithm of (Vcore–Vcladding)/100, to demonstrate the effect when the acoustic velocity difference between the core 10 and cladding 20 approaches zero (negative infinity in FIG. 10). In fact, only a slight appreciable increase in the SBS threshold is achieved until the acoustic velocity difference is positive and small, i.e., core velocity minus cladding velocity, is less than 10 m/s, preferably less than 1 m/s. However, this can be extremely difficult to implement requiring control of the dopant distribution using 'typical' oxide dopants (such as $GeO_2$) to <0.1 weight %.

Where, for example, a fiber having a small core diameter and nonlinear application, such as various lightweight components, for example isolators, are desired, a fiber with a substantially uniform acoustic velocity in the radial direction of the core can be provided. For example, where the core diameter is less than 5 micrometers, the acoustic velocity difference between the core and cladding (Vcore–Vcladding) is positive and <100 m/s. However, at some point the acoustic velocity difference brings diminishing returns since SBS in the cladding will begin to dominate, and therefore the embodiment is one where the acoustic velocity difference is greater than 5 m/s.

Figure 11:
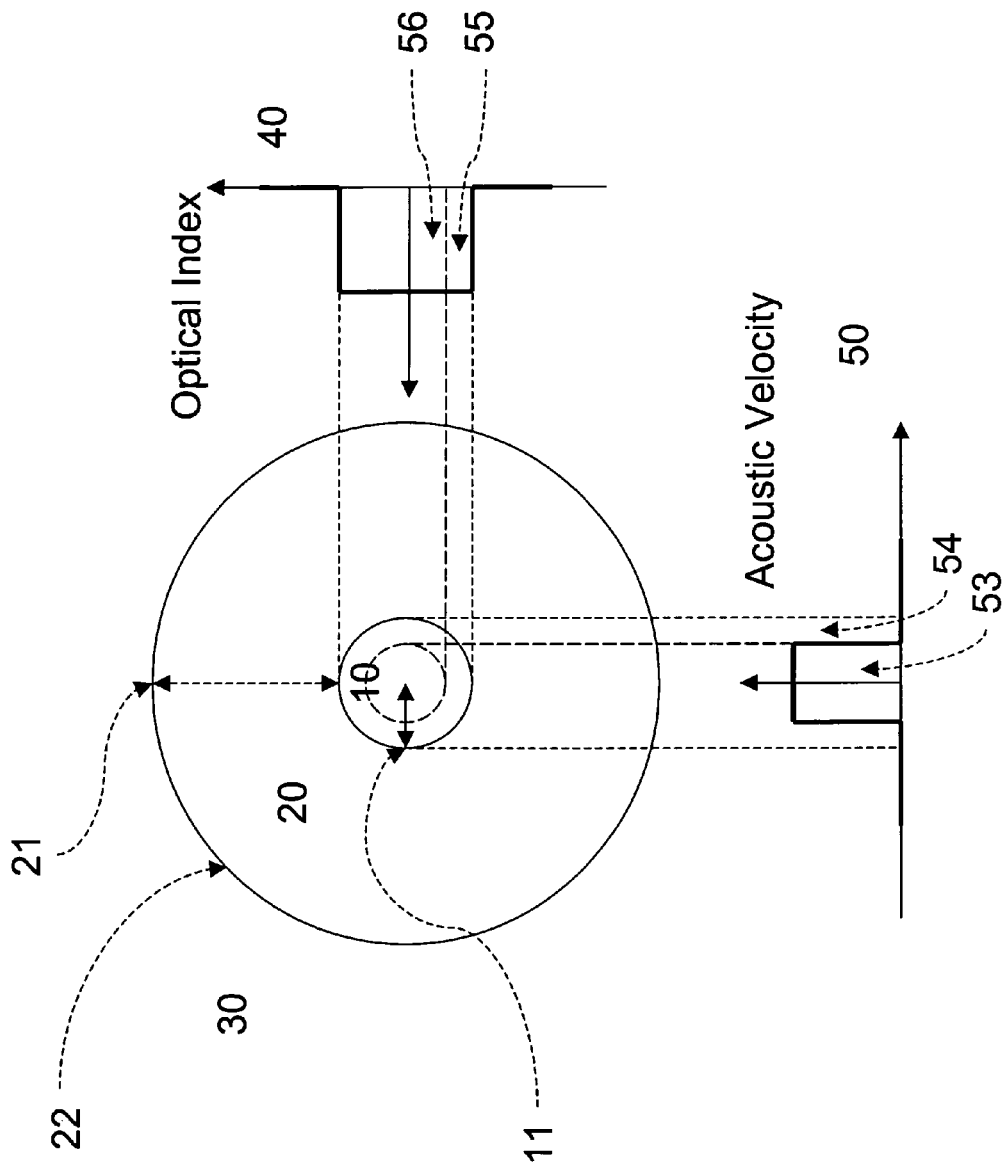
FIG. 11 illustrates an end view of an exemplary waveguide configuration of a traditional step-index fiber showing, in particular, a schematic representation of each of the optical and acoustic profiles thereof, wherein an acoustic core diameter is less than an optical core diameter.

Referring to FIG. 9, for smaller core diameters, the acoustic waveguide attenuation can be increased. However, in some applications, the core diameter is set by the required optical properties. Therefore, the optical and acoustic cores can be decoupled and made to be of substantially dissimilar size. An example of such an embodiment is shown in FIG. 11, where the fiber core 10 has an index of refraction and a core radius 11, with the radius of the acoustic core 53 less than that of the optical core. Thus, an outer region 55 of the optical core 10 is doped, such that it has the same index of refraction as an inner region 56, but the acoustic velocity is substantially similar to that of the cladding 54.

However, if the acoustic core diameter is made too small, a cladding interaction will dominate, since most of the optical mode will reside in the acoustic cladding. Therefore, there is a minimum acoustic core diameter relative to the optical mode diameter. This is a trade-off that depends strongly on the requirements of the optical mode, and should be simulated or modeled for each case.

In yet another embodiment, medium range fibers, suitable for telecom, some lasers, such as singlemode lasers, power transmitting fibers, and other uses can be constructed in accordance with the principles herein. In an embodiment, the optical fiber has an optical core and at least one optical cladding, therein defining an optical mode with a diameter. The diameter of the optical core is less than 10 micrometers. The acoustic core diameter is less than that optical core diameter, but greater than ⅕ of the optical mode diameter. The region adjacent to the acoustic core having an acoustic velocity within 20 m/s that of the optical cladding, the acoustic waveguide attenuation coefficient is set to be substantially similar to or greater than the material damping coefficient. The acoustic velocity of the acoustic core Vcore and that of the cladding Vclad are set to positive values 20 m/s<Vcore−Vclad<100 m/s.

Figure 12:
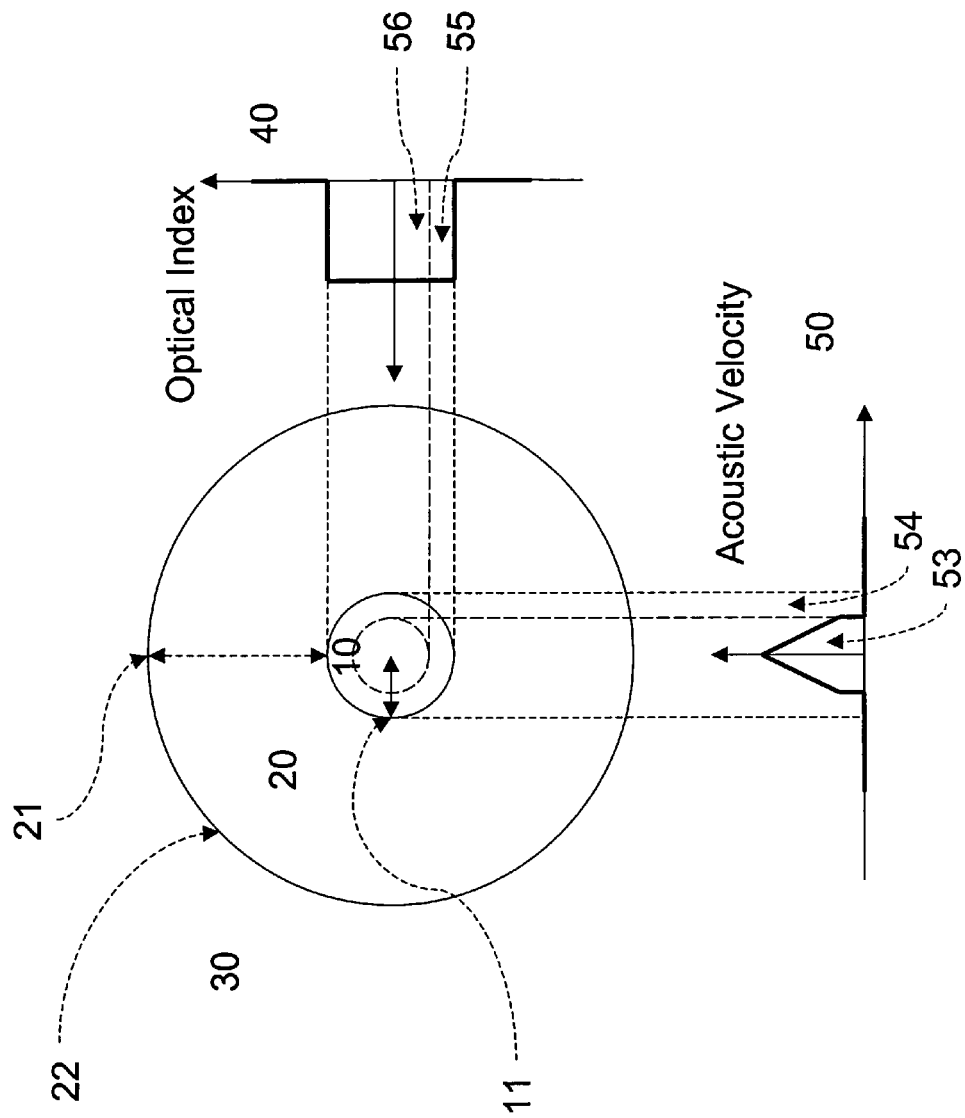
FIG. 12 illustrates an end view of an exemplary waveguide configuration of a traditional step-index fiber showing, in particular, a schematic representation of each of the optical and acoustic profiles thereof, wherein the acoustic core diameter is less than the optical core diameter, and the acoustic core has a non-uniform acoustic velocity profile.

It will be understood by those skilled in the art that the acoustic regions 53 and 54 may also be non-uniform. For example, FIG. 12 shows an acoustic core that has a non-uniform acoustic velocity profile. The core 10 may also have either a uniform or non-uniform refractive index profile. Therefore one can also consider a fiber of the previous paragraph, wherein the acoustic core has a non-uniform acoustic velocity distribution, and/or where an outer region of the optical core 55 is non-uniform.

Figure 13:
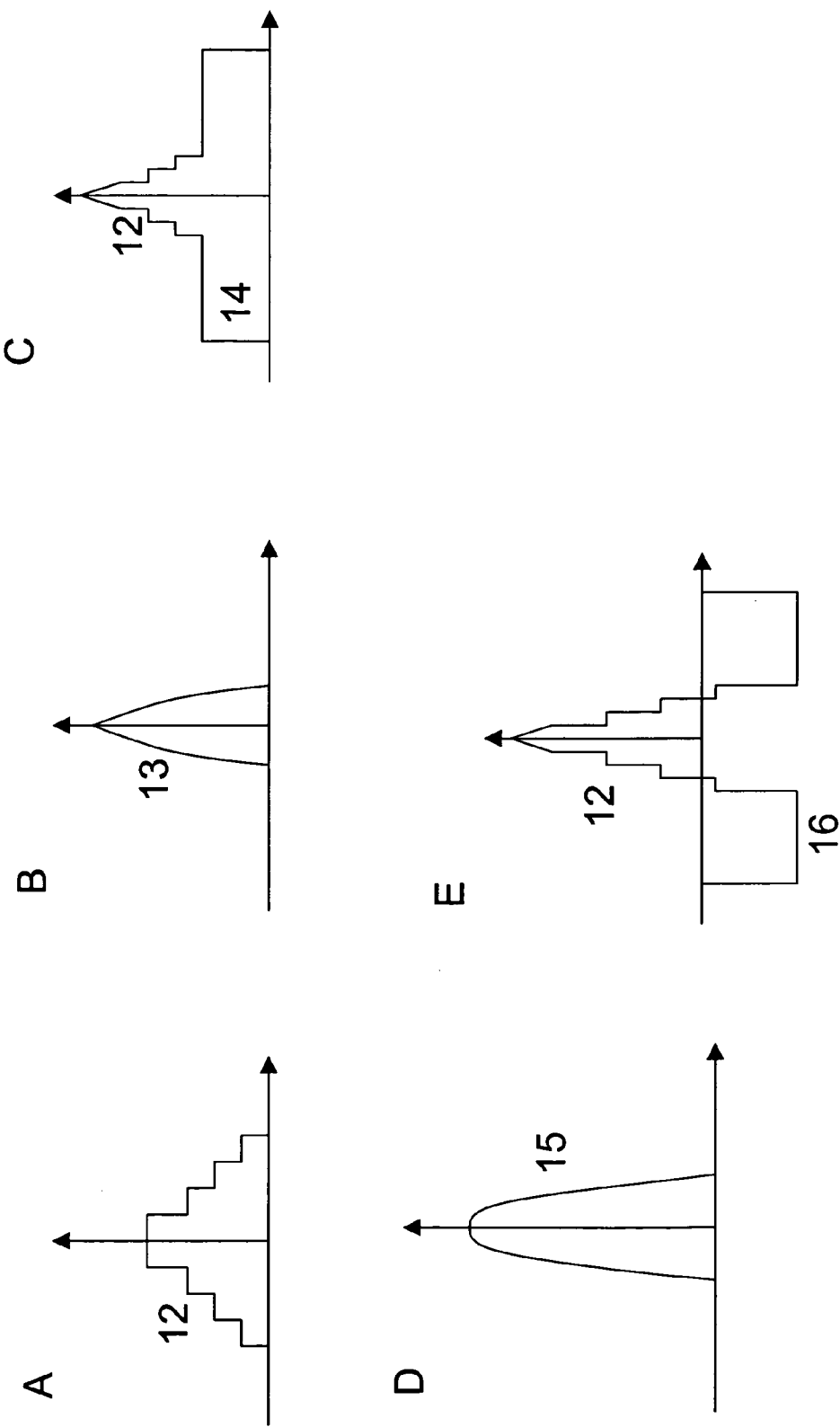
FIG. 13 illustrates exemplary embodiments of acoustic velocity profiles that can be used to greatly exacerbate coupling of acoustic waves away from optical waves

The embodiments illustrated in FIG. 13 can be applied to large anti-guiding structures, such as large fibers suitable for use in lasers, communication networks and in components, in particular passive components, such as components in laser systems.

Figure 14:
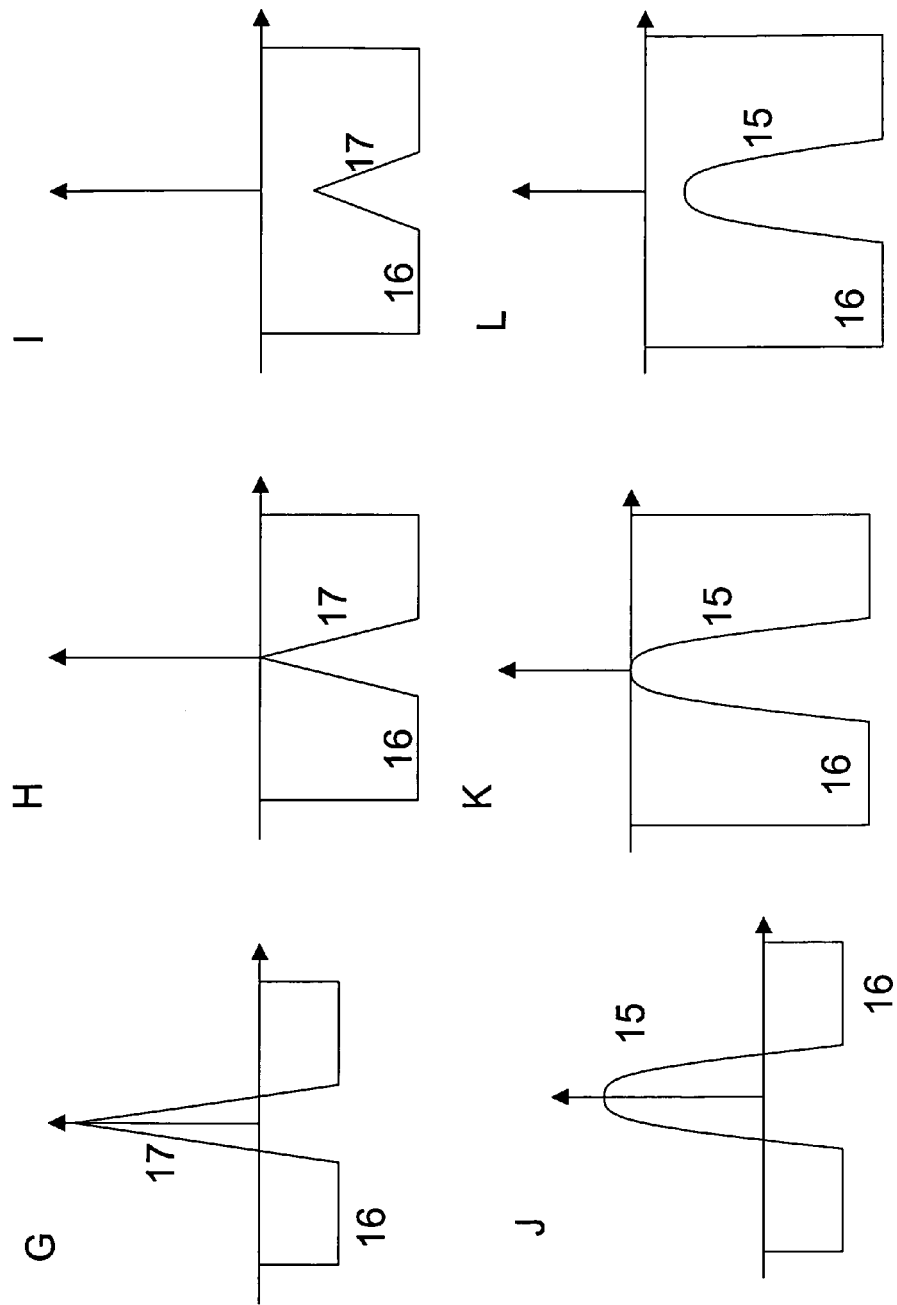
FIG. 14 illustrates additional embodiments of acoustic velocity profiles that can be used to greatly exacerbate coupling of acoustic waves away from the optical waves.

From this analysis, several embodiments of the present invention can be realized. In particular, FIGS. 13 and 14 show several acoustic velocity profiles that can be engineered to exacerbate the acoustic wave loss and therefore increase the SBS threshold.

In particular, FIGS. 13A, B, and D represent three configurations that can provide substantial increases to the acoustic wave loss in the anti-guiding fibers. FIGS. 13 A, B, and D represent three embodiments of the same principle, wherein the acoustic velocity in a central layer decreases from a maximum central value to a minimum value of the acoustic velocity characteristic of at least one acoustic cladding. FIG. 13A represents a step-like change in the acoustic velocity 12. FIGS. 13B and D represent changes in the acoustic velocity that are Gaussian-like functions, 13 and 15.

In an embodiment, each of the regions of 13A are less than approximately 2.0 micrometers in thickness and the acoustic velocity step between each region is less than approximately 100 m/s, but also that the frequency spacing between frequency-adjacent modes is at least one half of the Brillouin bandwidth.

In the same embodiment, the overlap integral of at least one acoustic mode with the optical mode is less than 0.5.

In another embodiment the SBS threshold is designed to be greater than 10 times that of bulk material.

In another embodiment, the acoustic velocity changes in a Gaussian-like manner wherein the acoustic waveguide loss coefficient is designed to be greater than the material absorption coefficient.

In still another embodiment, the fibers of FIGS. 13A,B and D have a core diameter 11 of approximately 20 micrometers, and the acoustic velocity changes by a total of greater than approximately 250 m/s.

In another embodiment, the fibers of FIGS. 13A,B and D have a core diameter 11 of approximately 5 micrometers, and the acoustic velocity changes by a total of greater than 75 m/s.

In another embodiment, the fibers of FIGS. 13A,B and D have a core diameter 11 of approximately 9 micrometers, and the acoustic velocity changes by a total of greater than approximately 225 m/s.

In yet another preferred embodiment, the step-like profile of FIG. 13A is surrounded by a first acoustic cladding layer. The acoustic velocity of this cladding layer is less than the maximum value of the acoustic velocity in the central layer. This is represented by FIGS. 13C and E. The acoustic velocity may be higher 14 or lower 16 than that of a surrounding outer cladding. The acoustic cladding layer has material properties set such that the round-trip acoustic material damping loss in that layer is at least 1/e.

It will be known to those skilled in the art that the refractive index of the first acoustic layer may be selected such that it is a depressed inner cladding, matched inner cladding, or pedestal inner cladding.

Pursuant to the previous paragraphs, the step-like change in the acoustic velocity can be replaced by a Gaussian-like profile shown in FIGS. 14J, K, and L.

Following from the preceding paragraph, the step-like change in the acoustic velocity profile can be replaced by a linear profile shown in FIGS. 14G, H, and I.

In still another embodiment, the fibers of FIGS. 14G, H, and I have a core diameter 11 of approximately 20 micrometers, and the acoustic velocity changes by a total of greater than approximately 250 m/s.

In yet another embodiment, the fibers of FIGS. 14G, H, and I have a core diameter 11 of approximately 5 micrometers, and the acoustic velocity changes by a total of greater than 75 m/s.

In still another embodiment, the fibers of FIGS. 14G, H, and I have a core diameter 11 of approximately 9 micrometers, and the acoustic velocity changes by a total of greater than 225 m/s.

A structure constructed in accordance with the principles herein can be provided in an apparatus having at least one component wherein at least one component is constructed of one or more optical fibers; the at least one component is used to combine two or more optical signals; at least one of the fibers of the at least one component has reduced SBS; and the at least one of the fibers has an acoustic waveguide loss that is at least ½ of the acoustic material damping loss.

A method to suppress SBS in a structure, such as a waveguide, can also be provided. The method includes the steps of setting a core region to guide optical waves; forming a cladding comprised of a material with an index of refraction and acoustic velocity; selecting an inner region to have an index which is greater than that of the cladding and an acoustic velocity that is greater than that in the cladding; setting the inner region properties to produce a waveguide attenuation coefficient that is at least one-tenth that of the material damping loss coefficient; and setting the core region to be acoustically anti-guiding with respect to the cladding.

A method to suppress SBS in a waveguide can also be provided. The methods includes the steps of providing a core material selected with at least one constituent selected from the group Ge, P, F, B, and Si; and setting the cladding acoustic velocity such that the waveguide attenuation coefficient is at least one-tenth that of the material damping loss coefficient.

Yet another method to suppress SBS in a waveguide can be provided. The method includes the steps of selecting a core material with at least one constituent selected from the group Ge, P, F, B, and Si; and adding at least one additional constituent selected from the group Al, Y, until the waveguide attenuation coefficient is at least one-tenth that of the material damping loss coefficient.

An optical fiber that has propensity to suppress SBS can be constructed in accordance with the principles herein. The optical fiber includes a core and a cladding. The cladding can be formed of pure silica. The core can include a doped silica, wherein the silica is doped with, for example, yttria.

A waveguide configuration can be constructed in accordance with the principles herein wherein the radial thickness from boundary to boundary of the acoustic region occupied by each acoustic mode is less than 2.5 micrometers while the acoustic velocity difference is less than 500 m/s. The waveguide configuration can be further defined wherein the acoustic waveguide loss coefficient is greater than or equal to the material damping coefficient for at least one acoustic mode. Further, an overlap integral of each acoustic mode present in the acoustic waveguide can have an overlap integral with the optical mode of less than 0.5. The acoustic velocity can decrease in a step-like fashion from the center of the fiber. The acoustic velocity can decrease in a linear fashion from the center of the fiber. The acoustic velocity can decrease in a Gaussian-like fashion from the center of the fiber.

Another embodiment of a waveguide can include a central acoustic region surrounded by a first acoustic cladding. The acoustic velocity of the first acoustic cladding is less than that of an outer acoustic cladding. The acoustic velocity of the central acoustic region increases from its outer boundary to a maximum acoustic velocity that is greater than that of the first acoustic cladding. The radial thickness from boundary to boundary of the acoustic region occupied by each acoustic mode can be less than 2.0 micrometers while the acoustic velocity difference is less than 1000 m/s. The acoustic waveguide loss coefficient can be greater than or equal to the material damping coefficient for at least one acoustic mode. The overlap integral of at least one acoustic mode present in the acoustic waveguide can have an overlap integral with the optical mode of less than 0.5. The acoustic velocity can decrease in a step-like fashion from the center of the fiber. The acoustic velocity can decrease in a linear fashion from the center of the fiber. Alternatively, the acoustic velocity can decrease in a Gaussian-like fashion from the center of the fiber. The optical fiber can also contain polarization preserving structures.

A materials model is presented next, expanded to include three components, $SiO_2$, $GeO_2$, and $Al_2O_3$. The model assumes that the doped glass is separable into three distinct regions of a unit volume. Each region has a pure oxide constituent possessing unique intrinsic physical properties such as mass density, acoustic velocity, etc. The volume fractions of components $GeO_2$, $Al_2O_3$, and $SiO_2$ can be $m_1-m_0$, $m_2-m_1$, and $m_3-m_2$, respectively, with $m_0=0$ (origin) and $m_3=1$ (unit volume).

In summary, m can be calculated by relating the volume fraction of a constituent oxide to its molar content (as a molar percentage of the total) via the molar volume. This leads to a matrix representation for the value m that can be found as a function of molar volume parameters to be $$\begin{pmatrix} m_1 \\ m_2 \end{pmatrix} = \begin{pmatrix} \left(\frac{\rho_g}{M_g}([D_g]-1) - \frac{\rho_a}{M_a}[D_g]\right) & \left(\frac{\rho_a}{M_a}[D_g] - \frac{\rho_s}{M_s}[D_g]\right) \\ \left(\frac{\rho_g}{M_g}[D_a] - \frac{\rho_a}{M_a}([D_a]-1)\right) & \left(\frac{\rho_a}{M_a}([D_a]-1) - \frac{\rho_s}{M_s}[D_a]\right) \end{pmatrix}^{-1} \begin{pmatrix} -\left(\frac{\rho_s}{M_s}[D_g]\right) \\ -\left(\frac{\rho_s}{M_s}[D_a]\right) \end{pmatrix} \quad (5)$$

where $\rho$ is the mass density and M is the molar mass. The subscripts refer to the constituents D in the obvious way (i.e. a=Al2O3, etc.), with $[D_i]$ representing the concentration (mole fraction) of constituent oxide i.

The key bulk parameters needed to design an acoustically anti-guiding fiber are then determined using the following set of summations $$V_a = \left(\sum_{i=1}^{3} \frac{m_i - m_{i-1}}{V_{ai}}\right)^{-1} \quad (6)$$

$$\rho = \sum_{i=1}^{3} (m_i - m_{i-1})\rho_i \quad (7)$$

$$n = \sum_{i=1}^{3} (m_i - m_{i-1})n_i \quad (8)$$

with constituents (i) indexed as $(1,2,3)=(GeO_2, Al_2O_3, SiO_2)$. The gain coefficient is then calculated from these summations using Eqn. 1.

TABLE II

SUMMARY OF MODELING PARAMETERS

| D | $V_L$ (m/s) | n (@ 1534 nm) | $\rho$ (kg/m$^3$) |
|---|---|---|---|
| $SiO_2$ | 5970 | 1.445 | 2200 |
| $GeO_2$ | 3510 | 1.571 | 3650 |
| $Al_2O_3$ | 10800 | 1.634 | 3990 |
| P2O5 | 4085 | 1.482 | 2390 |

A coarse estimate of the materials properties of a few select common dopants of interest in this analysis are shown in Table II. It will be obvious to those skilled in the art that slight variations in these values may result from processing conditions during glass and fiber manufacture, and that many other dopants can be selected to achieve anti-guiding fibers in accordance with the principles herein.

Figure 15:
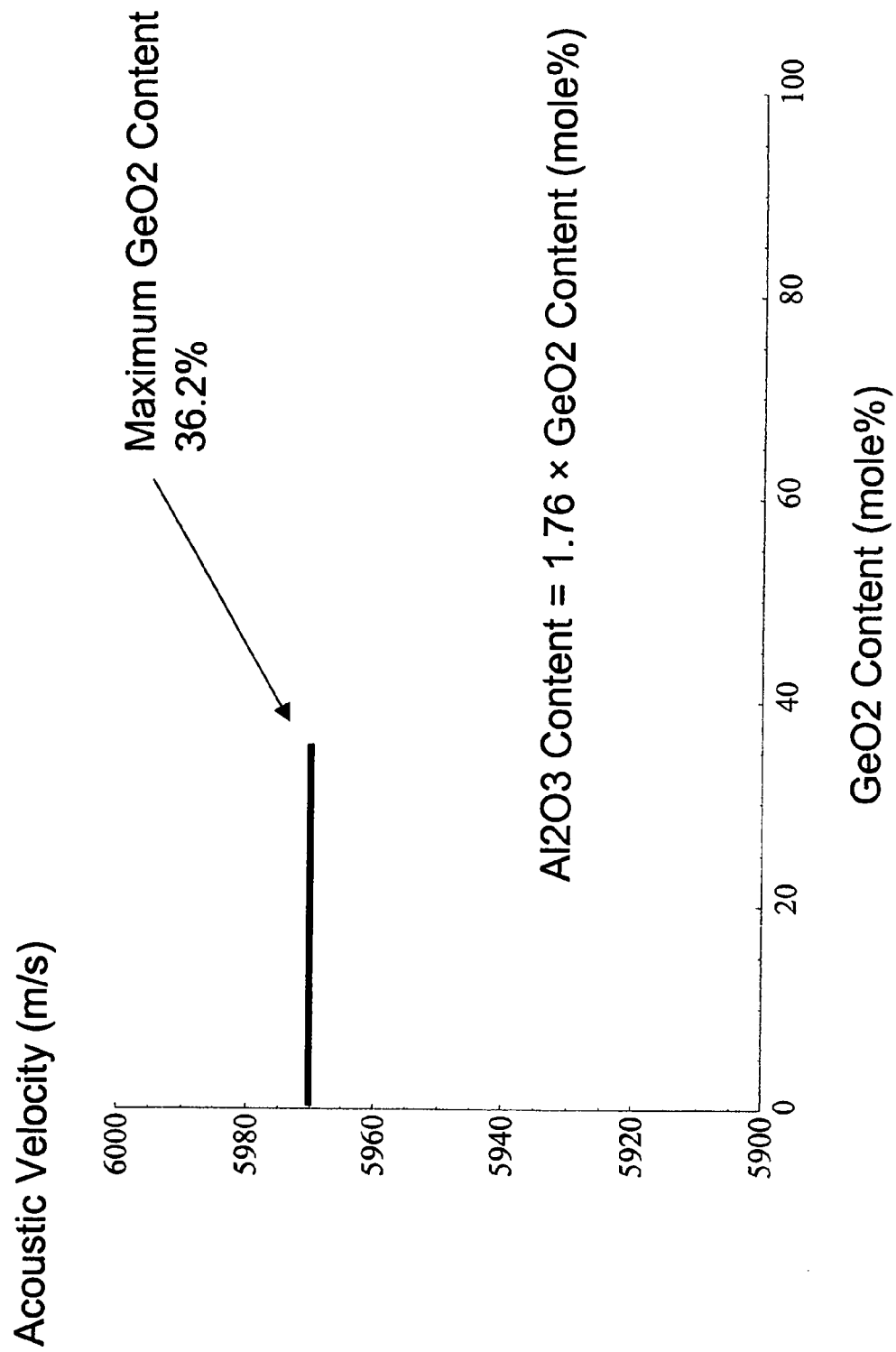
FIG. 15 illustrates graphically a suitable optional doping scheme for achieving an acoustic velocity of pure silica with an anti-guiding structure constructed in accordance with the principles herein, wherein geranium is the dopant.
Figure 16:
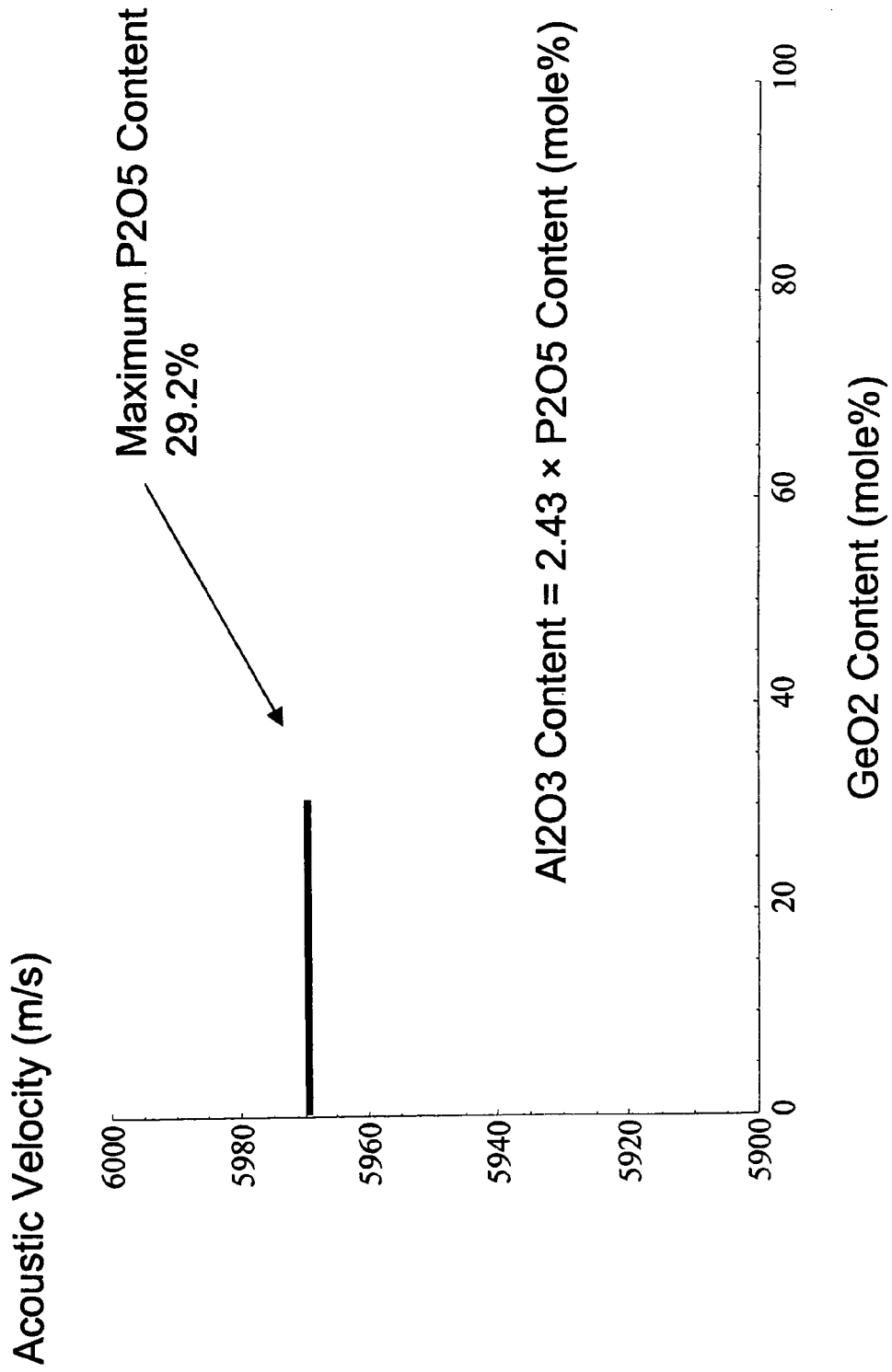
FIG. 16 illustrates graphically a suitable optional doping scheme for achieving an acoustic velocity of pure silica with an anti-guiding structure constructed in accordance with the principles herein, wherein phosphorus is the dopant.

First, a fiber with GeO2 codoped with Al2O3 in silica is considered. FIG. 15 shows a plot of the acoustic velocity as a function of GeO2 content (mole % of oxide) for the condition where the fiber is silica-based, and the Al2O3 content (mole % of oxide) is 1.76 times the GeO2 content (mole % of oxide). At this point, the acoustic velocity of the material is the same as the pure silica for any amount of GeO2. If the cladding is pure silica, then we find the condition that the Al2O3 content (mole %) for an acoustically anti-guiding fiber with Ge co-dopant must have the condition

[Al2O3]≥1.76[GeO2] in the whole core region.

A similar calculation for a P2O5+Al2O3 co-doped silica fiber with a pure silica cladding yields that the following condition is required for acoustic anti-guidance

[Al2O3]≥2.43[P2O5] in the whole core region.

It will be obvious to those skilled in the art that both GeO2 and P2O5 can be simultaneously combined with Al as dopants in SiO2 and still form an acoustic antiguide using the model from above.

In an embodiment, a fiber core, containing one or both of Al and Ge, has a diameter less than or equal to approximately 5 micrometers, the velocity profile is substantially uniform, and the Al2O3 content follows the following rule 4 mole %+1.76[GeO2]≥[Al2O3]≥1.76[GeO2]

wherein the acoustic waveguide attenuation coefficient is at least equivalent to that of pure silica at some optical wavelength. The brackets denote the mole % concentration of specified dopant.

In another embodiment, a fiber core, containing one or both of Al and P, has a diameter less than or equal to approximately 5 micrometers, the velocity profile is substantially uniform, and the Al2O3 content follows the following rule 4 mole %+2.43[P2O3]≥[Al2O3]≥2.43 [P2O3]

wherein the acoustic waveguide attenuation coefficient is at least equivalent to that of pure silica at some optical wavelength. The brackets denote the mole % concentration of specified dopant.

In yet another embodiment, the core is doped with one or both of GeO2 and Al2O3 in silica, has a diameter less than or equal to approximately 5 micrometers, the acoustic velocity profile is decreasing outward from the center of the fiber, the Al2O3 content in the center of the fiber follows the rule 6 mole %+1.76[GeO2]≥[Al2O3]≥1.76[GeO2]

and the aluminum concentration [Al2O3] in the core decreases by less than a total of 6 mole %, while the [GeO2] increases by a maximum of 3.4 mole % in the radial direction, wherein the acoustic waveguide attenuation coefficient is at least two times that of pure silica at some optical wavelength.

In yet another embodiment, the core is doped with one or both of GeO2 and Al2O3 in silica, has a diameter less than or equal to approximately 5 micrometers, the acoustic velocity profile is decreasing outward from the center of the fiber, the Al2O3 content in the center of the fiber follows the rule 6 mole %+1.76[GeO2]≥[Al2O3]≥1.76[GeO2]

and the aluminum concentration [Al2O3] in an outer region of the core is at least 1.5 mole %, wherein the acoustic waveguide attenuation coefficient is at least two times that of pure silica at some optical wavelength.

In still another embodiment, the core is doped with one or both of GeO2 and Al2O3 in silica, has an optical core diameter less than or equal to approximately 10 micrometers, the acoustic core diameter is less than the optical core diameter but greater than 1/5 of the optical mode diameter, the Al2O3 content in the acoustic core 8 mole %+1.76[GeO2]≥[Al2O3]≥1.76[GeO2]

With an acoustic inner cladding extending about the core, the aluminum concentration [Al2O3] in the inner acoustic cladding region is at least 1.5 mole % and has an acoustic velocity substantially close to, that of pure silica, wherein the acoustic waveguide attenuation coefficient is at least equal to that of pure silica at some optical wavelength.

In yet another embodiment, the core is doped with P2O5 and Al2O3 in silica, has a diameter less than or equal to approximately 5 micrometers, the acoustic velocity profile is decreasing outward from the center of the fiber, the Al2O3 content in the center of the fiber follows the rule 6 mole %+2.43[P2O3]≥[Al2O3]≥2.43[P2O3]

and the aluminum concentration [Al2O3] in the core decreases by less than a total of 6 mole %, while the [P2O5] increases by a maximum of 2.47 mole % in the radial direction, wherein the acoustic waveguide attenuation coefficient is at least two times that of pure silica at some optical wavelength.

In accordance with the principles herein, an embodiment of a fiber can be formed by starting with a silica host and an amount of Al2O3 is determined and added to the core area of the preform using any of the usual well-known doping methods. The acoustic velocity of the core with that amount of Al2O3 is then calculated or determined and compared with the cladding acoustic velocity.

For the desired optical core diameter, if the core acoustic velocity is too big compared with the cladding, one may add some GeO2 and/or P2O5 until the desired velocity difference is achieved. If the index of refraction ends up being too large, some B2O3 or F can be added to the core. The dopant concentrations are adjusted until the acoustic waveguide loss is at the desired level.

For large fibers, it is hard to fabricate a fiber with an acoustic velocity difference that is small enough since the doping tolerances may be too tight. In this case, an embodiment of a fiber constructed in accordance with the principles herein can include an optical core and an acoustic core that can be treated separately. As such, for a large fiber start with a core that has Al2O3, an outer region of the core having a greater abundance of P2O5 and/or GeO2 such that the outer region of the core has an acoustic velocity similar to, but greater than, that of the cladding is formed. In this way, the acoustic core is smaller than that of the optical core. The size of the acoustic core is selected such that the acoustic waveguide loss is at the desired level.

The embodiments described herein are exemplary. Thus it will be appreciated that although the embodiments are described in terms of specific technologies, other equivalent technologies could be used to implement systems in keeping with the spirit of the present invention.

I claim:

1. A waveguide configuration comprising:
an optical core having an optical core radial thickness and a core index of refraction, and, at least one optical cladding adjacent the core, the at least one optical cladding having a cladding index of refraction, wherein the core and the cladding together define an optical mode; and
an acoustic core defined by a doped outer region of the optical core and having the same centerline and a smaller radius than optical core and having a core acoustic velocity, the doped outer region of the optical core having an acoustic velocity less than the core acoustic velocity and 20 m/s or less higher than the acoustic velocity of the at least one optical cladding;
wherein the waveguide is an optical waveguide and an acoustic anti-guiding waveguide wherein an acoustic waveguide loss coefficient takes on a value greater than one times a material damping coefficient thereby reducing the time of interaction between an optical and an acoustic wave in the waveguide.

2. The waveguide configuration of claim 1 wherein the acoustic core diameter is less than 75% of the optical core diameter and an overlap integral of each acoustic mode present in the acoustic anti-guiding waveguide has the overlap integral with the optical mode of the optical core of less than 0.75.

3. The waveguide configuration of claim 1 wherein the acoustic core diameter is less than 75% of the optical core diameter and an overlap integral of each acoustic mode present in the acoustic anti-guiding waveguide has the overlap integral with the optical mode of the optical core of less than 0.5.

4. The waveguide configuration of claim 1 wherein a frequency spacing between each acoustic mode is greater than one half of the Brillouin bandwidth.

5. The waveguide configuration of claim 1 wherein an acoustic anti-guiding waveguide loss coefficient takes on a value between one tenth and one times the material damping coefficient of the core.

6. An acoustically anti-guiding fiber comprising:
a fiber core; and
a fiber cladding adjacent the fiber core having an outer boundary;
said fiber cladding comprising a thickness and a doping profile such that the acoustic wave obeys the equation $$1/\pi \Delta v_B < 2b/V_c$$

where $\Delta v_B$ is the Brillouin spectral width, b is the position of the cladding outer boundary, $V_c$ is the cladding acoustic velocity and $2b/V_c$ is the round-trip time of an acoustic wave reflecting from the outer boundary of the cladding back to the core;
wherein acoustic wave transmission properties of the fiber cladding do not impact an optical waveguide in the fiber core and stimulated Brillouin scattering (SBS) in the acoustically anti-guiding fiber is minimized.

7. An acoustically anti-guiding fiber as claimed in claim 6, wherein at least one of the fiber core and the fiber cladding is doped with at least 5 mole % of $B_2O_3$.

8. An acoustically anti-guiding fiber as claimed in claim 7, wherein a silica core material is doped with Al2O3 and co-doped with either $GeO_2$ or $P_2O_5$ such that the $Al_2O_3$ content is at minimum $1.76 \times GeO_2$ or $2.43 \times P_2O_5$ content (mole %).

9. An acoustically anti-guiding fiber as claimed in claim 7, wherein a $SiO_2$ core is co-doped with $GeO_2$, $P_2O_5$, and $Al_2O_3$.

10. An acoustically anti-guiding optical fiber comprising:
an optical core, wherein the optical core has a diameter of more than 10 microns;
a cladding adjacent to and surrounding the optical core, said cladding having an interface at an outer boundary of the cladding;
aluminum substantially uniformly distributed radially outward from the center of the optical core throughout the core material;
at least one of Germanium (Ge) and Phosphorus (P) distributed throughout said optical core with increasing content in an outward radial direction from the core up to said cladding; and
a layer provided in either an outer portion of the optical core or an inner portion of the cladding, the layer containing at least 4 mol % in aggregate of one or both of Ge and P.

11. An acoustically anti-guiding optical fiber as claimed in claim 10, further comprising at least one of B and F, wherein the content of the at least one of B and F is increasing in the radial direction outward from the center of the core, and wherein acoustic velocity decreases radially outward from the center of the core.

12. An acoustically anti-guiding optical fiber as claimed in claim 10, wherein either $B_2O_3$ or F is selectively added to the core when the index of refraction is too large.

13. An acoustically anti-guiding optical fiber constructed in accordance with the waveguide of claim 10, comprising:
an optical core containing at least one of Aluminum and Yttrium, wherein the fiber has an acoustic waveguide attenuation coefficient of at least one half of the material dampening coefficient of pure silica.

14. An acoustically anti-guiding optical fiber as claimed in claim 13, wherein the Aluminum content in the core is substantially non-uniform.

15. An acoustically anti-guiding fiber as claimed in 13, wherein an acoustic velocity of the core decreases radially outward from a center of the core.

16. An acoustically anti-guiding fiber as claimed in claim 13, wherein the core is surrounded by a cladding, and wherein the cladding is doped such that it has a lower acoustic velocity than any region of the core.

17. An acoustically anti-guiding fiber as claimed in claim 13, wherein the core acoustic velocity is selectively reduced by adding additional dopant.

18. An acoustically anti-guiding fiber as claimed in claim 13, wherein the optical core includes an acoustic core, and wherein an acoustic velocity of the fiber decreases radially outward from the center of the core.

19. The acoustically anti-guiding fiber of claim 6 wherein the fiber cladding diameter is 90 micrometers or greater to dampen the acoustic wave to 1/e of its value in the fiber core.

20. The waveguide configuration of claim 1 wherein an acoustic wave reflecting from an outer boundary of the at least one optical cladding has a round-trip time of $2b/V_c$ that is greater than $1/\pi \Delta V_b$ where $\Delta V_b$ is a Brillouin spectral width, b is the position of an outer boundary of the optical cladding and $V_c$ is the cladding acoustic velocity.

21. An acoustically anti-guiding optical fiber of claim 10 wherein said cladding is also doped with at least one of Germanium (Ge) and Phosphorus (P) with increasing content in an outward radial direction.

22. An acoustically anti-guiding fiber of claim 6 wherein said fiber cladding further comprises:
a thickness and a doping profile with an acoustic waveguide loss coefficient of at least 15,000 inverse meters.

* * * * *